(12) United States Patent
Sato (10) Patent No.: US 11,327,705 B2
(45) Date of Patent: May 10, 2022

(54) DISPLAY SYSTEM, DISPLAY METHOD, AND DISPLAY PROGRAM FOR DISPLAYING IMAGE ON HEAD-MOUNTED DISPLAY

(71) Applicant: SEIKO EPSON CORPORATION, Tokyo (JP)

(72) Inventor: Shinya Sato, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/080,806

(22) Filed: Oct. 26, 2020

(65) Prior Publication Data

US 2021/0132889 A1    May 6, 2021

(30) Foreign Application Priority Data

Nov. 1, 2019    (JP) .............................. JP2019-199704

(51) Int. Cl.
*G06F 3/14* (2006.01)
*G02B 27/01* (2006.01)
*G06T 7/70* (2017.01)
*G06V 20/00* (2022.01)

(52) U.S. Cl.
CPC ........... *G06F 3/14* (2013.01); *G02B 27/0172* (2013.01); *G06T 7/70* (2017.01); *G06V 20/00* (2022.01); *G02B 2027/014* (2013.01); *G02B 2027/0138* (2013.01)

(58) Field of Classification Search
CPC ....... G06F 3/14; G06F 3/147; G02B 27/0172; G02B 2027/0138; G02B 2027/014; G02B 27/017; G02B 2027/0187; G02B 2027/0178; G06K 9/00624; G06K 9/00671; G06T 7/70; G09G 5/12; G09G 2370/22; H04N 1/10; H04N 13/332; H04R 2201/10; G06V 20/00; G06V 20/20
See application file for complete search history.

(56) References Cited

U.S. PATENT DOCUMENTS

| | | | |
|---|---|---|---|
| 2018/0108149 A1 | 4/2018 | Levinshtein | |
| 2018/0365853 A1* | 12/2018 | Yang | ......................... G06T 7/75 |
| 2019/0197994 A1* | 6/2019 | Kunitomo | ............. G06F 3/1423 |
| 2019/0287489 A1* | 9/2019 | Tomizawa | ................ G06T 7/20 |
| 2019/0318201 A1* | 10/2019 | Ahmed | .................... G06T 19/20 |

FOREIGN PATENT DOCUMENTS

JP    2018-067115    4/2018

\* cited by examiner

*Primary Examiner* — David D Davis
(74) *Attorney, Agent, or Firm* — JCIPRNET (57) ABSTRACT

The display system includes a host apparatus and an HMD. The host apparatus includes an image display unit configured to display, an image transmitted from the host apparatus, in which the image processing unit is configured, when detecting that the host apparatus is connected with the HMD, to associate first sensor data from the first inertial sensor with second sensor data received from the second inertial sensor, to recognize a target in the image captured by the camera, to use the second sensor data to perform image processing, and to cause the image display unit to display the image after the image processing in association with the target, when detecting that the host apparatus is not connected with the HMD, to use the first sensor data to maintain an estimation of a state of the target in the outside scene until the host apparatus is reconnected with the HMD.

9 Claims, 6 Drawing Sheets

DISPLAY SYSTEM, DISPLAY METHOD, AND DISPLAY PROGRAM FOR DISPLAYING IMAGE ON HEAD-MOUNTED DISPLAY

The present application is based on, and claims priority from JP Application Serial Number 2019-199704, filed Nov. 1, 2019, the disclosure of which is hereby incorporated by reference herein in its entirety.

BACKGROUND

1. Technical Field

The present disclosure relates to a display system, a display method, and a display program.

2. Related Art

There is disclosed, in JP 2018-67115 A, a tracking method for combining scene recognitions when performing recognition of a target.

In a head-mounted display (abbreviated as "HMD") connected to a host apparatus, it is conceivable to perform an augmented reality (abbreviated as "AR") display that superimposes an image on a target such as an object in real space, as in the technology in JP 2018-67115 A. However, when performing recognition of the target or the like based on an image-captured by a camera of the HMD, the captured image is stopped from being supplied from the camera of the HMD when the HMD is somehow removed from the host apparatus, to thus prevent an update of information. Then, the HMD may come to a state different from a state when the HMD is removed even when the HMD is reconnected. In such a case, there is no continuity of information between the information acquired from the HMD before the removal of the HMD and the information acquired from the HMD after the reconnection of the HMD, which makes it necessary to recreate an environment for performing the AR display.

SUMMARY

According to an aspect of the present disclosure, a display system including a host apparatus and a head-mounted display connected to the host apparatus is provided. In the display system, the host apparatus includes a first inertial sensor and an image processing unit, and the head-mounted display includes a camera, a second inertial sensor and an image display unit. The first inertial sensor is configured to detect an inertia exerted on the host apparatus. The camera is configured to capture an outside scene. The second inertial sensor is configured to detect the inertia exerted on the head-mounted display. The image display unit is configured to display, together with the outside scene, an image transmitted from the host apparatus. The image processing unit is configured to, when detecting that the host apparatus is connected with the head-mounted display, associate first sensor data from the first inertial sensor with second sensor data received from the second inertial sensor, recognize a target in the image captured by the camera, use the second sensor data to perform image processing, and cause the image display unit to display the image after the image processing in association with the target. The image processing unit is also configured to, when detecting that the host apparatus is not connected with the head-mounted display, use the first sensor data to maintain an estimation of a state of the target in the outside scene until the host apparatus is reconnected with the head-mounted display. According to the above aspect, the image processing unit can use data from the first inertial sensor to maintain the estimation of the state of the target even when the host apparatus is disconnected from the head-mounted display to disable acquisition of data from the second inertial sensor.

DESCRIPTION OF EXEMPLARY EMBODIMENTS

First Embodiment

Figure 1:
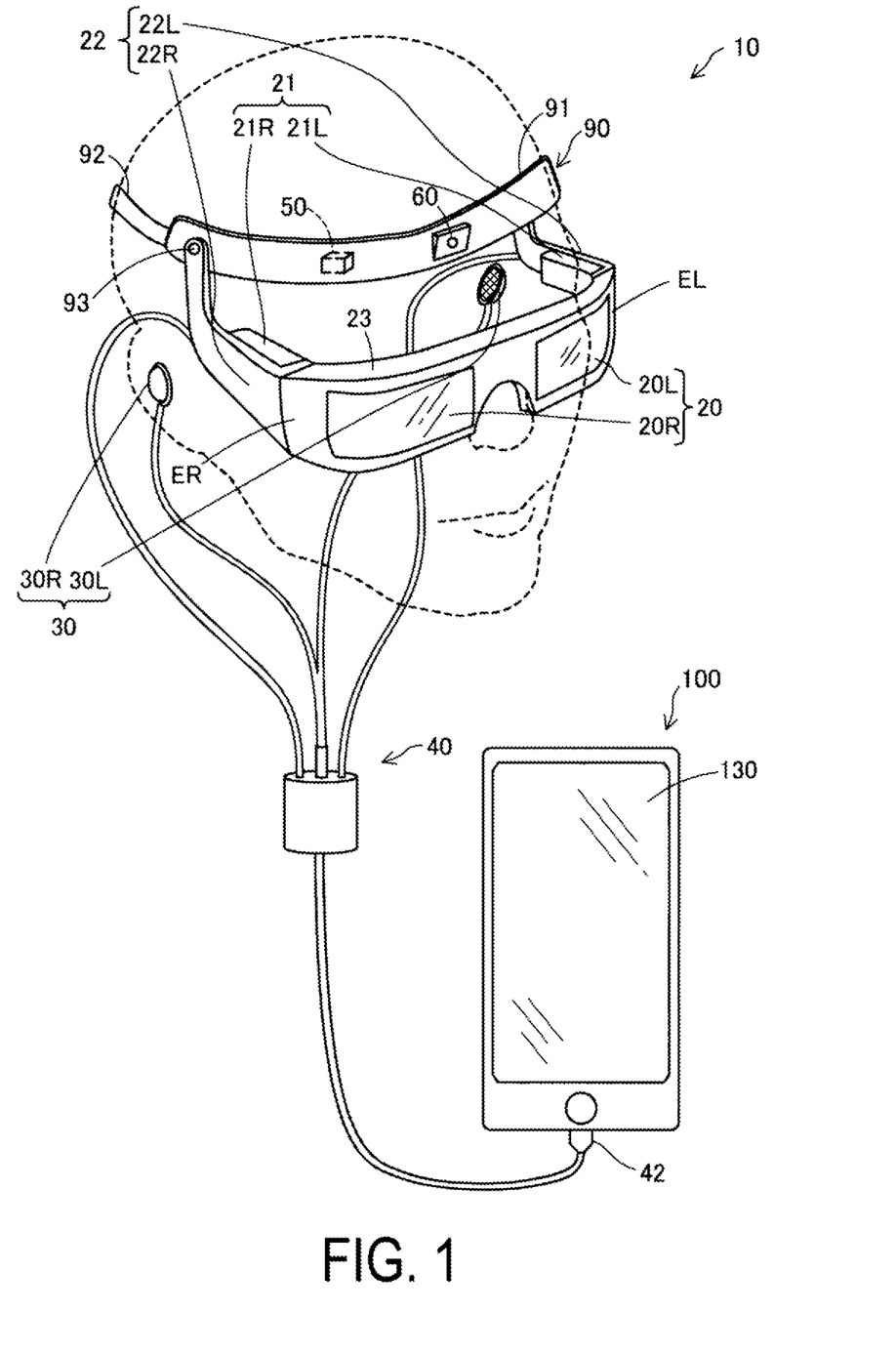
FIG. 1 is an explanatory view illustrating a schematic configuration of a head-mounted display.

FIG. 1 is an explanatory view illustrating a schematic configuration of a head-mounted display 10 (hereinafter abbreviated as "HMD 10"). The HMD 10 of the first embodiment is of an optical transmissive-type. That is, the HMD 10 allows a user to perceive a virtual image, and allows, at the same time, the user to directly visually recognize light coming from an outside scene (scene) encompassing an object.

The HMD 10 includes a mounting band 90 mountable on the head of the user, a display unit 20 configured to display an image, earbuds 30, a cable 40, a camera 60, and a host apparatus 100 configured to control the display unit 20. The display unit 20 causes the user to perceive an augmented reality image (AR image) in a state of being worn on the head of the user. The AR is an abbreviation for "Augmented Reality", and is typically translated to "augmented reality". The AR is one that "virtually augments" the world being present before the eyes by displaying virtual visual information in a manner superimposed on a real scene or the like. In the AR, the virtual visual information is superimposed on the image or video captured by the camera 60 to be displayed on the display unit 20, for example.

The mounting band 90 includes a mounting base portion 91 made of resin, a belt 92 fabricated from cloth, which is linked to the mounting base portion 91, an inertial sensor 50, and the camera 60. The mounting base portion 91 has a curved shape that matches a shape of the frontal region of the head of a person. The belt 92 is to be mounted around the head of the user.

The camera 60, which serves as, for example, an RGB sensor, functions as an image-capturing unit. The camera 60 is configured to capture the outside scene, and is disposed at a central part of the mounting base portion 91. That is, the camera 60 is disposed at a position corresponding to the center of the forehead of the user in a state where the mounting band 90 is being mounted on the head of the user.

Accordingly, the camera 60 captures the outside scene, which is a scene outside of a gaze direction of the user, in a state where the user wears the mounting band 90 on the head, and acquires a captured image, which is the image that has been captured.

The inertial sensor 50 (Inertial Measurement Unit 75, hereinafter referred to as "IMU 50") serves as an inertia measurement device of six degrees of freedom. The IMU 50 includes acceleration sensors of three axes of an x-axis, y-axis, and z-axis, and gyro sensors about the three axes to acquire six degrees of freedom (6-DoF) information of the HMD 10. The 6-DoF, which represents a freedom of motion, includes motions in the x-axis, y-axis, and z-axis, and rotational motions about the x-axis, y-axis, and z-axis. The IMU 50 is built-in in the mounting base portion 91. Accordingly, the IMU 50 acquires the 6-DoF information of the HMD 10.

The display unit 20, which includes a display drive unit 21 and a holding unit 22, is linked to the mounting base portion 91 of the mounting band 90. Note that the display unit 20 is shaped like a pair of spectacles. Thus, the display unit 20 includes a right display unit 20R and a left display unit 20L. The display drive unit 21 also includes a right display drive unit 21R and a left display drive unit 21L, and the holding unit 22 also includes a right holding unit 22R and a left holding unit 22L.

The right display unit 20R and the left display unit 20L, which are each incorporated in the right and left portions of a frame 23, are located in front of the right and left eyes of the user when the user wears the display unit 20. The right display unit 20R and the left display unit 20L are coupled to each other at the respective central side edge portions.

The right holding unit 22R, which has a shape extending in a substantially horizontal direction from an end portion ER of the right display unit 20R and being inclined obliquely upward from the middle point, connects the end portion ER with a linking portion 93 on the right side of the mounting base portion 91. Similarly, the left holding unit 22L, which has a shape extending in a substantially horizontal direction from an end portion EL of the left display unit 20L and being inclined obliquely upward from the middle point, connects the end portion EL with a linking portion (not illustrated) on the left side of the mounting base portion 91. The linking portions 93 each link the right holding unit 22R or the left holding unit 22L in a manner rotatable around the linking portion 93 and fixable to any rotational position. This allows the display unit 20 to be provided in a manner rotatable with respect to the mounting base portion 91.

The right display drive unit 21R and the left display drive unit 21L are each disposed at an inner side of the right holding unit 22R or the left holding unit 22L that is a part corresponding to a temple of the HMD 10.

The HMD 10 includes a right earbud 30R mounted on the right ear of the user and a left earbud 30L mounted on the left ear.

The display drive unit 21, the earbuds 30, the inertial sensor 50, and the camera 60 of the HMD 10 are connected to the host apparatus 100 via the cable 40. The cable 40 supplies power from the host apparatus 100 to the HMD 10, and exchanges information between the HMD 10 and the host apparatus 100. At a tip end of the cable 40 is provided with a connector 42. The cable 40 is connected to the host apparatus 100 using the connector 42. The host apparatus 100 serves as a smartphone, for example. The host apparatus 100 generates the virtual visual information that is to be superimposed on the image or video acquired from the HMD 10, and sends the information to the HMD 10. The HMD 10 displays the virtual visual information on the display unit 20.

Figure 2:
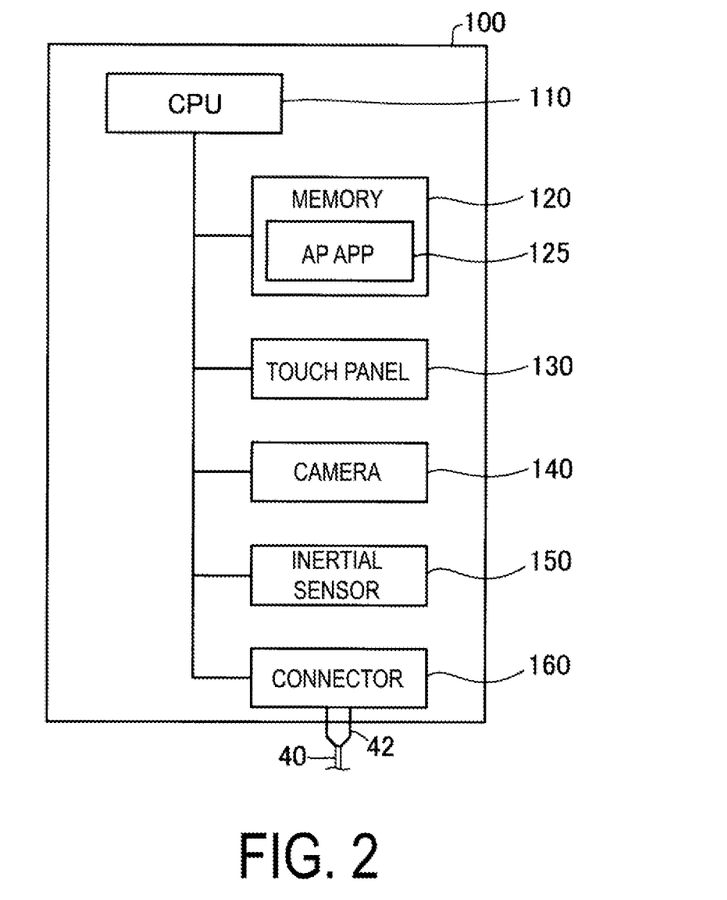
FIG. 2 is an explanatory diagram illustrating a schematic configuration of a host apparatus.

FIG. 2 is an explanatory diagram illustrating a schematic configuration of the host apparatus 100. As described above, the host apparatus 100, which serves as the smartphone, and includes a CPU 110, a memory 120, a touch panel 130, a camera 140, an inertial sensor 150, and a connector 160. In the memory 120, an AP app 125 serving as a computer program is stored. The AP app 125, which is performed by the CPU 110, causes the virtual visual information to be superimposed on the image or video acquired from the HMD 10.

The touch panel 130 serves as an input and output device of the host apparatus 100. The inertial sensor 150 (hereinafter abbreviated as "IMU 150") serves as the inertia measurement device of six degrees of freedom. The IMU 150 includes acceleration sensors of the three axes (the x-axis, y-axis, and z-axis) and gyro sensors about the three axes (about the x-axis, the y-axis, and the z-axis) to acquire six degrees of freedom (6-DoF) of the host apparatus 100. Note that, for convenience, the IMU 150 is also referred to as first inertial sensor and the IMU 50 as second inertial sensor.

The connector 42 of the cable 40 is connected to the connector 160. That is, the host apparatus 100 acquires the image or video captured by the camera 60 of the HMD 10 and the 6-DoF information of the IMU 50 via the connector 42 and the cable 40 that are connected to the connector 160, and sends the AR image to the HMD 10.

Figure 3:
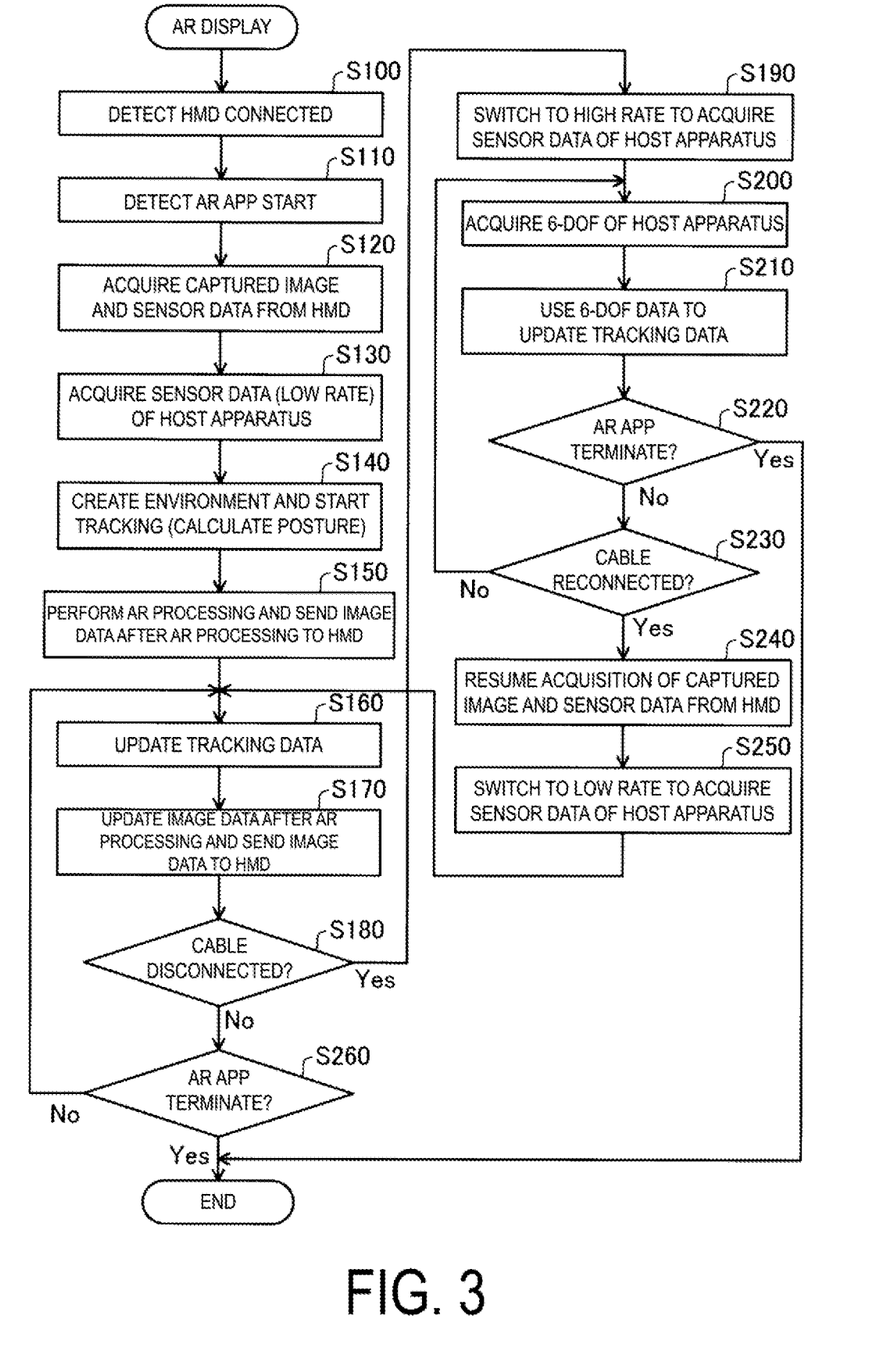
FIG. 3 is a control flow chart of an AR display executed by a CPU of a host apparatus.

FIG. 3 is a control flow chart of an AR display executed by the CPU 110 of the host apparatus 100. In step S100, upon the user plugging the connector 42 of the cable 40 of the HMD 10 into the connector 160 of the host apparatus 100, the CPU 110 detects that the HMD 10 has become connected to the host apparatus 100 and transitions the processing to step S110.

In step S110, upon the user selecting and executing the AP app 125 of the host apparatus 100, the CPU 110 executes the AP app 125. The selection and execution of the AP app 125 by the user are executed by tapping an icon of the AP app 125 displayed on the touch panel 130, for example.

In step S120, the CPU 110 acquires the captured image of the camera 60 from the HMD 10, and acquires sensor data from the IMU 50. The sensor data are the 6-DoF information, for example.

In step S130, the CPU 110 acquires the sensor data from the IMU 150 of the host apparatus 100 at a first sampling rate (low rate).

In step S140, the CPU 110 creates an environment. The creation of the environment represents recognition of a relative position between the HMD 10 and the host apparatus 100, and a correlation of the sensor data of the IMU 50 and the IMU 150. That is, when the HMD 10 is connected to the host apparatus 100 via the cable 40, a motion of the HMD 10 is assumed to be approximately the same as a motion of the host apparatus 100. However, because orientations of the three axes of the IMU 50 are not necessarily matched with orientations of the three axes of the IMU 150, the CPU 110 associates the sensor data from the IMU 50 with the sensor data from the IMU 150. This allows the CPU 110 to predict, when acquiring the sensor data of either one of the IMUs, the sensor data of the other IMU. Then, the CPU 110 recognizes a target in the image acquired from the HMD 10, and executes a tracking for tracking the target, to calculate a posture of the target.

In step S150, the CPU 110 executes augmented reality processing (also referred to as "AR processing") that superimposes an image on the image of the tracked target and sends image data after the AR processing to the HMD 10.

In step S160, the CPU 110, after an elapse of a predetermined amount of time, acquires the captured image and the sensor data from the HMD 10, and updates tracking data for tracking the target in the image. In step S170, the CPU 110 updates the image data after the AR processing and sends the data to the HMD 10. The steps S160 and S170 are repeatedly executed at a predetermined time interval until the connector 42 of the cable 40 is removed from the connector 160 of the host apparatus 100 to become disconnected in the next step S180.

In step S180, the CPU 110, upon detecting that the connector 42 of the cable 40 has been removed from the connector 160 of the host apparatus 100 to become disconnected, transitions the processing to step S190. Note that the CPU 110, when the HMD 10 is not disconnected to the host apparatus 100, transitions the processing to step S260.

In step S190, the CPU 110 causes a sampling rate at which the first sensor data is acquired from the IMU 150 of the host apparatus 100 to be switched to a second sampling rate (high rate) of a higher rate than the first sampling rate. Setting the sampling rate to the high rate enables the motion of the host apparatus 100 to be more minutely detected. In step S200, the CPU 110 acquires the first sensor data, that is, the 6-DoF information from the IMU 150 of the host apparatus 100.

In step S210, the CPU 110 uses the 6-DoF information acquired from the IMU 150 to recognize the target in the image acquired from the camera 60 provided at the HMD 10 before the cable 40 becomes the disconnected state, and updates the tracking data for tracking the target in the image. In step S220, the CPU 110 detects whether the user has terminated the AP app. The CPU 110, upon detecting the termination of the AP app, terminates the processing according to this control flow chart. The CPU 110, when not detecting the termination of the AP app, transitions the processing to step S230.

In step S230, the CPU 110, upon detecting that the connector 42 of the cable 40 has become connected to the connector 160 of the host apparatus 100, transitions the processing to step S240. Note that the CPU 110, when not detecting the connection between the HMD 10 and the host apparatus 100, transitions the processing to step S200.

In step S240, the CPU 110 acquires the captured image of the camera 60 from the HMD 10, and resumes the acquisition of the sensor data from the IMU 50.

In step S250, the CPU 110 causes the sampling rate at which the sensor data is acquired from the IMU 150 of the host apparatus 100 to be switched from the second sampling rate (high rate) to the first sampling rate (low rate). Then, the CPU 110 transitions the processing to step S160.

In step S260, the CPU 110 detects whether the user has terminated the AP app. The CPU 110, upon detecting the termination of the AP app, terminates the processing according to this control flow chart. The CPU 110, when not detecting the termination of the AP app, transitions the processing to step S160.

Figure 4:
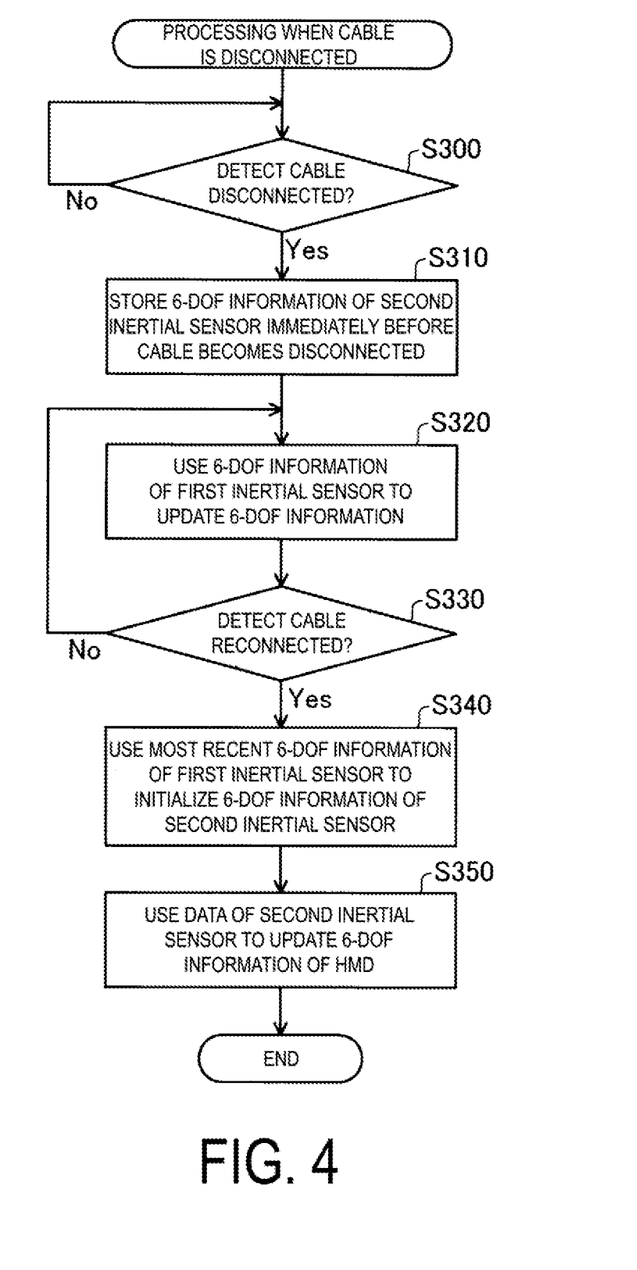
FIG. 4 is a process flow chart of 6-DoF information when a cable via which a CPU executes processing becomes disconnected and when the cable becomes reconnected.

FIG. 4 is a process flow chart of the 6-DoF information when the cable 40 via which the CPU 110 executes processing becomes disconnected and when the cable becomes reconnected. In step S300, the CPU 110, upon detecting that the HMD 10 has been removed from the host apparatus 100 to become disconnected, transitions the processing to step S310.

In step S310, the CPU 110 stores, in the memory 120, the 6-DoF information of the IMU 50 of the HMD 10 immediately before the HMD 10 and the host apparatus 100 become disconnected. For example, the CPU 110 stores, in the memory 120, the 6-DoF information of the IMU 50 of the HMD 10, and performs an update at regular time intervals. When the HMD 10 and the host apparatus 100 become disconnected, the CPU 110 becomes unable to acquire the 6-DoF information of the IMU 50 of the HMD 10, and becomes unable to update the 6-DoF information in the memory 120. The CPU 110 may use the 6-DoF information immediately before becoming unable to update the 6-DoF information in the memory 120 as an alternative to the 6-DoF information of the IMU 50 of the HMD 10 immediately before the HMD 10 and the host apparatus 100 become disconnected.

In step S320, the CPU 110 uses the second sensor data (6-DoF information) of the IMU 150 of the host apparatus 100 to update the 6-DoF information of the IMU 50, which is stored in the memory 120.

In step S330, the CPU 110, upon detecting that the HMD 10 and the host apparatus 100 have become reconnected in step S300, transitions the processing to step S340. Note that the CPU 110, when not detecting the reconnection, transitions the processing to step S320.

In step S340, the CPU 110 uses the most recent 6-DoF information of the IMU 50 of the HMD 10 to update the 6-DoF information of the IMU 50 of the HMD 10. Specifically, the CPU 110 further performs correction of, using the most recent 6-DoF information of the IMU 50 of the HMD 10, the 6-DoF information of the IMU 50 of the HMD 10 immediately before the HMD 10 and the host apparatus 100 become disconnected, which is stored in step S310 and updated using the 6-DoF information of the IMU 150 of the host apparatus 100 in step S320, to perform data correction again in a manner that the 6-DoF information of the IMU 50 of the HMD 10 shall be deemed as continuous data. This allows a relative position between the HMD 10 and the host apparatus 100 and a relationship between the first sensor data and the second sensor data to be corrected in a manner that enables the relative position and the relationship to be handled as the same relationship, between when the HMD 10 becomes disconnected and when the HMD 10 becomes reconnected. Note that the relative position between the HMD 10 and the host apparatus 100 and the relationship between the first sensor data and the second sensor data may be reconfigured when the host apparatus 100 is encompassed in an imaging range of the camera 60 of the HMD 10 after the HMD 10 has been reconnected to perform recomplementation of the 6-DoF information of the IMU 50 of the HMD 10 as described above. This makes it possible to reset effects due to errors and the like occurring when the HMD 10 is reconnected to complement the sensor data, for example.

In step S350, the CPU 110 uses second inertial data newly acquired from the IMU 50 of the HMD 10 to update the 6-DoF information of the HMD 10 that is initialized in step S340.

As described above, according to the first embodiment, even when the HMD 10 and the host apparatus 100 become disconnected, and the CPU 110 is unable to acquire the second sensor data from the IMU 50 of the HMD 10, the CPU 110 of the host apparatus 100 can use the first sensor data from the IMU 150 of the host apparatus 100 to continue recognition of the target in the captured image of the camera 60 of the HMD 10, to perform the AR processing. This makes it unnecessary to initialize and recreate the relative position between the HMD 10 and the host apparatus 100 and the relationship between the first sensor data and the second sensor data, as the creation of the environment for performing the AR display after the HMD 10 has become reconnected to the host apparatus 100, for example. Note that the CPU 110 may be configured to use the first sensor data to estimate a difference of an amount of state change in the recognition of the target. This makes it easy to maintain the recognition of the target. Here, the term "state" represents a position and the posture of the target. Note that, the CPU 110, as long as maintaining the recognition of the target, may not be configured to estimate the difference of the amount of state change in the recognition of the target.

The CPU 110 may be configured to add an identical timestamp to the first sensor data and the second sensor data that are simultaneously acquired. This makes it easy to associate the first sensor data with the second sensor data. Note that the CPU 110, as long as recognizing a time difference between the first sensor data and the second sensor data, may be configured to add different timestamps.

In the above-described embodiment, the CPU 110 acquires the first sensor data from the IMU 150 of the host apparatus 100 at the first sampling rate of a low rate when the HMD 10 is connected to the host apparatus 100. On the other hand, the CPU 110 acquires the first sensor data from the IMU 150 of the host apparatus 100 at the second sampling rate of a high rate when the HMD 10 is not connected to the host apparatus 100. However, the CPU 110 may acquire the first sensor data from the IMU 150 of the host apparatus 100 at an identical sampling rate in either case of when the HMD 10 is connected to the host apparatus 100 or when the HMD 10 is not connected to the host apparatus 100.

In the first embodiment, when the camera 60 captures the host apparatus 100, the CPU 110 may recognize and initialize the relative position between the camera 60, that is, the HMD 10, and the host apparatus 100. The CPU 110 can recognize the relative position between the HMD 10 and the host apparatus 100 and the relationship between the first sensor data and the second sensor data with higher accuracy.

Second Embodiment

Figure 5:
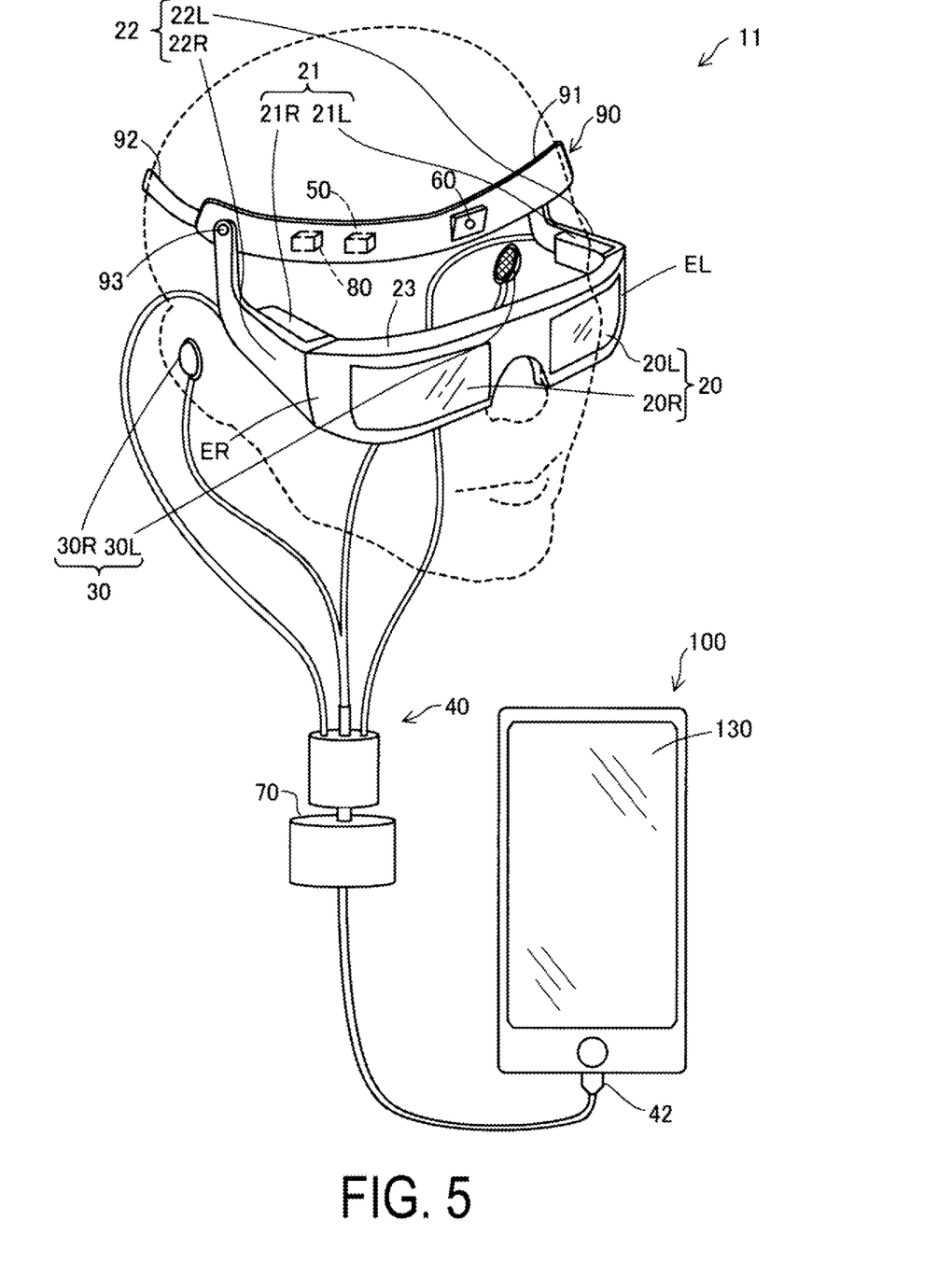
FIG. 5 is an explanatory view illustrating a schematic configuration of a head-mounted display of a second embodiment.

FIG. 5 is an explanatory view illustrating a schematic configuration of a head-mounted display 11 (referred to as "HMD 11") of the second embodiment. The HMD 11 includes a battery 70 and a memory 80 in addition to the configuration of the HMD 10. The same reference signs are denoted to the same configurations as in the HMD 10. The battery 70 is configured to supply power to the HMD 11 even when the connector 42 of the cable 40 is removed from the host apparatus 100. The memory 80 stores the second sensor data of the IMU 50.

Figure 6:
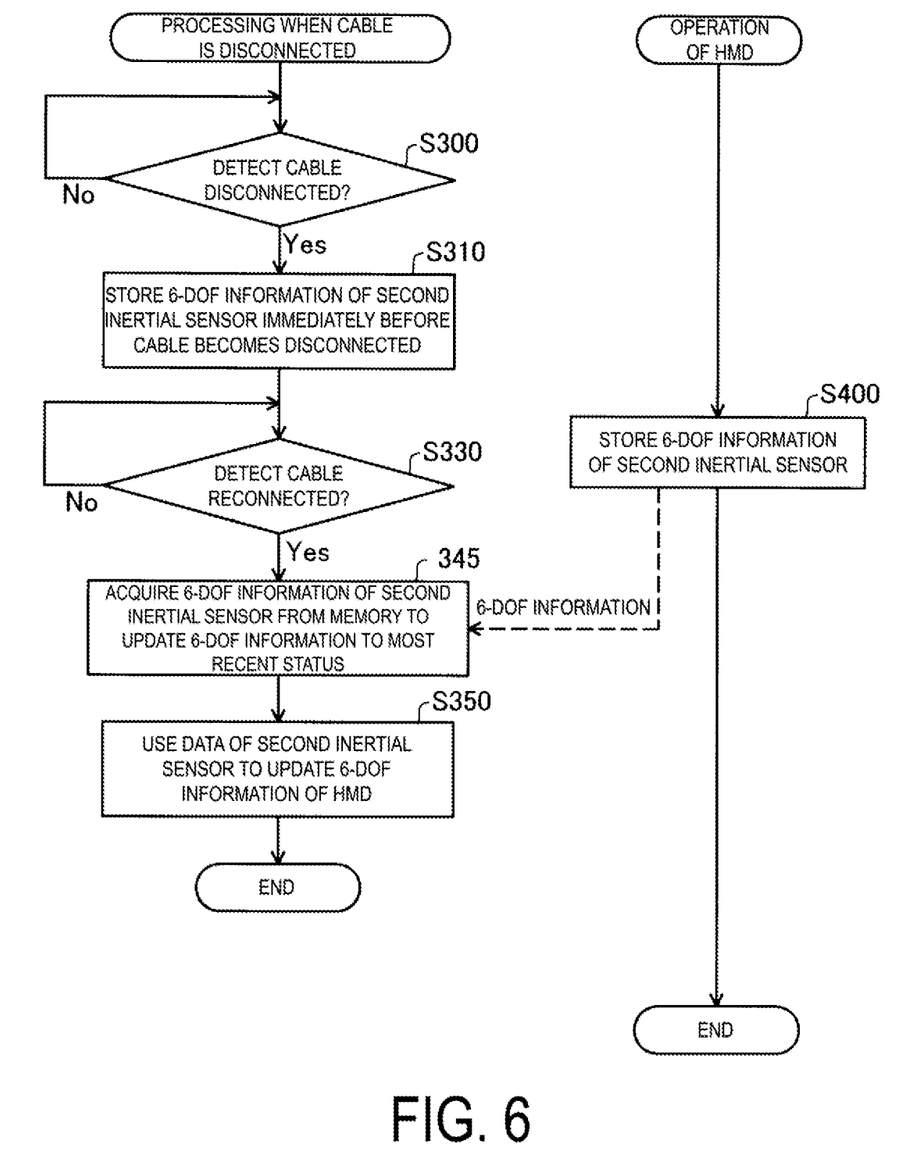
FIG. 6 is a process flow chart of 6-DoF information when a cable via which a CPU and an HMD execute processing becomes disconnected in a second embodiment and when the cable becomes reconnected.

FIG. 6 is a process flow chart of the 6-DoF information when the cable 40 via which the CPU 110 and the HMD 10 execute processing becomes disconnected in the second embodiment and when the cable 40 becomes reconnected. The different points from the flowchart depicted in FIG. 4 are that this process flow chart does not include the step S320 and includes step S345 in place of the step S340, and includes step S400 executed by the HMD 10. Hereinafter, the different points are described.

The HMD 10 executes the step S400 when the cable 40 is not connected. In step S400, the HMD 10 stores the second sensor data of the IMU 50 in the memory 80 at predetermined time intervals. A power required at this time is supplied from the battery 70.

On the other hand, in step S330, the CPU 110 of the host apparatus 100, upon detecting that the HMD 10 and the host apparatus 100 have become reconnected, transitions the processing to step S345. Note that the CPU 110 repeatedly executes the step S330 until detecting the reconnection.

In step S345, the CPU 110 acquires the second sensor data (6-DoF information) of the IMU 50, which are stored in the memory 80, and updates the second sensor data of the IMU 50, which are stored in the memory 120 to the most recent status.

As described above, according to the second embodiment, the HMD 11, which includes the battery 70, can store the second sensor data of the IMU 50 in the memory 80 even when the HMD 11 is not connected to the host apparatus 100. Accordingly, the CPU 110, when the HMD 11 is then reconnected to the host apparatus 100, can acquire the second sensor data stored in the memory 80 to acquire a motion of the HMD 11. This makes it unnecessary to recreate the environment for performing the AR display after the HMD 10 has become reconnected to the host apparatus 100.

In the above description, the HMD 10 and the HMD 11 serve as an HMD of an optical transmissive-type, and may also be an HMD that is not of the optically transmissive-type. In this case, the CPU 110 sends the image that the image captured by the camera 60 is superimposed on the AR image, to the HMD 10. In addition, in this case, the image may be, as an image other than the AR image, a VR image that displays an image of a virtual space configured based on an targeted object within the imaging range of the camera, an MR image that displays an image that the image of the virtual space is superimposed on the image captured by the camera, or the like.

The present disclosure is not limited to the above-described embodiments, and may be implemented in various aspects without departing from the spirits of the disclosure. For example, the present disclosure may be achieved through the following aspects. Appropriate replacements or combinations may be made to the technical features in the above-described embodiments which correspond to the technical features in the aspects described below to resolve some or all of the issues of the disclosure or to achieve some or all of the advantageous effects of the disclosure. Additionally, when the technical features are not described herein as essential technical features, such technical features may be deleted appropriately.

(1) According to an aspect of the present disclosure, the display system is provided, which includes the host apparatus and the head-mounted display connected to the host apparatus. In the display system, the host apparatus includes a first inertial sensor configured to detect an inertia exerted on the host apparatus, and an image processing unit, and the head-mounted display includes a camera configured to capture an outside scene, a second inertial sensor configured to detect the inertia exerted on the head-mounted display, and an image display unit configured to display, together with the outside scene, an image transmitted from the host apparatus, in which the image processing unit is configured, when detecting that the host apparatus is connected with the head-mounted display, to associate first sensor data from the first inertial sensor with second sensor data received from the second inertial sensor, to recognize a target in the image captured by the camera, to use the second sensor data to perform image processing, and to cause the image display unit to display the image after the image processing, while the image processing unit is configured, when detecting that the host apparatus is not connected with the head-mounted display, to use the first sensor data to maintain an estimation of a state of the target in the outside scene until the host apparatus is reconnected with the head-mounted display.

According to the above aspect, the image processing unit can use data from the first inertial sensor to recognize the target even when the host apparatus and the head-mounted display become disconnected to become unable to acquire data from the second inertial sensor.

(2) In the display system of the above-described aspect, the image processing unit may be configured to use the first sensor data to estimate a difference as an amount of state change in recognition of the target. According to the above aspect, it is possible to easily maintain the recognition of the target.

(3) In the display system of the above-described aspect, the image processing unit may be configured to add an identical timestamp to the first sensor data and the second sensor data. According to the above aspect, the first sensor data can be easily associated with the second sensor data.

(4) In the display system of the above-described aspect, the image processing unit may be configured, when detecting that the host apparatus is connected with the head-mounted display, to acquire the first sensor data at a first sampling rate, while the image processing unit may be configured, when detecting that the host apparatus is not connected with the head-mounted display, to acquire the first sensor data at a second sampling rate being higher than the first sampling rate. According to the above aspect, a motion of the host apparatus can be more minutely detected, and the target can be more accurately recognized.

(5) In the display system of the above-described aspect, the image processing unit may be configured, when detecting that the host apparatus is reconnected with the head-mounted display and detecting an initialization of the second inertial sensor, to acquire data from the first inertial sensor at the first sampling rate. According to the above aspect, the second sensor data can be acquired from the head-mounted display when the reconnection of the host apparatus with the head-mounted display is detected, which makes it unnecessary to minutely detect the first sensor data.

(6) In the display system of the above-described aspect, the image processing unit may be configured, when the camera captures the host apparatus, to recognize and initialize a relative position of the host apparatus with respect to the camera. According to the above aspect, the image processing unit can recognize the relative position between the camera (the head-mounted display) and the host apparatus with high accuracy.

(7) In the display system of the above-described aspect, the head-mounted display may include a power source and a storage unit, and may be configured, when the host apparatus is not connected with the head-mounted display, to use power from the power source to store the second sensor data in the storage unit, and in which the image processing unit may be configured, when the host apparatus is reconnected with the head-mounted display, to acquire the second sensor data after the host apparatus is disconnected from the head-mounted display, to perform recognition of the target. According to the above aspect, because the second sensor data when the head-mounted display and the host apparatus are in a disconnected state are stored in the storage unit, the image processing unit, after the host apparatus is reconnected with the head-mounted display, acquires the second sensor data of the storage unit to facilitate the recognition of the target.

The present disclosure may be embodied in various aspects other than the display system. For example, the present disclosure can also be embodied in aspects such as a display method, a display program as a computer program configured to embody the display method, a non-transitory computer-readable storage medium storing the display program, and the like.

What is claimed is:

1. A display system, comprising:
   a host apparatus; and
   a head-mounted display connected to the host apparatus, wherein
   the host apparatus includes
      a first inertial sensor configured to detect an inertia exerted on the host apparatus, and
      an image processing unit, and
   the head-mounted display includes
      a camera configured to capture an outside scene,
      a second inertial sensor configured to detect the inertia exerted on the head-mounted display, and
      an image display unit configured to display, together with the outside scene, an image transmitted from the host apparatus, wherein
   the image processing unit is configured to, when detecting that the head-mounted display is connected,
   associate first sensor data from the first inertial sensor with second sensor data received from the second inertial sensor,
   recognize a target in the image captured by the camera,
   use the second sensor data to perform image processing, and
   cause the image display unit to display the image after the image processing in association with the target,
   and the image processing unit is configured to, when detecting that the head-mounted display is not connected,
   use the first sensor data to maintain an estimation of a state of the target in the outside scene until the head-mounted display is reconnected.

2. The display system of claim 1, wherein
the image processing unit is configured to use the first sensor data to estimate a difference as an amount of state change in recognition of the target.

3. The display system of claim 1, wherein
the image processing unit is configured to add an identical timestamp to the first sensor data and the second sensor data.

4. The display system of claim 1, wherein
the image processing unit is configured to, when detecting that the head-mounted display is connected, acquire the first sensor data at a first sampling rate,
and the image processing unit is configured to, when detecting that the head-mounted display is not connected, acquire the first sensor data at a second sampling rate higher than the first sampling rate.

5. The display system according to claim 4, wherein
the image processing unit is configured to, when detecting that the head-mounted display is reconnected and detecting initialization of the second inertial sensor, acquire data from the first inertial sensor at the first sampling rate.

6. The display system of claim 1, wherein
the image processing unit is configured to, when the camera captures the host apparatus, recognize and initialize a relative position of the host apparatus with respect to the camera.

7. The display system of claim 1, wherein
the head-mounted display includes a power source and a storage unit, and is configured to, when the head-mounted display is not connected with the host apparatus, use power from the power source to store the second sensor data in the storage unit, and wherein
the image processing unit is configured to, when the head-mounted display is reconnected with the host apparatus, acquire the second sensor data after the head-mounted display is disconnected from the host apparatus, to perform recognition of the target.

8. A display method for displaying an image on a head-mounted display connected to a host apparatus,
the display method comprising: when detecting that the head-mounted display is connected with the host apparatus,
associating first sensor data of a first inertial sensor of the host apparatus with second sensor data received from the second inertial sensor of the head-mounted display;
recognizing a target in an image of an outside scene captured by a camera of the head-mounted display;
using the second sensor data to perform image processing; and
causing the image display unit to display the image after the image processing,
and the display method comprising, when detecting that the head-mounted display is not connected,
using the first sensor data to maintain an estimation of a state of the target in the outside scene until the head-mounted display is reconnected.

9. A non-transitory computer-readable storage medium storing a display program for displaying an image on a head-mounted display connected to a host apparatus,
the display program causing the host apparatus to execute functions of,
when detecting that the head-mounted display is connected with the host apparatus,
associating first sensor data of a first inertial sensor of the host apparatus with second sensor data received from the second inertial sensor of the head-mounted display;
recognizing a target in an image of an outside scene captured by a camera of the head-mounted display;
using the second sensor data to perform image processing; and
causing an image display unit of the head-mounted display to display the image after the image processing in association with the target,
and the functions of, when detecting that the head-mounted display is not connected with the host apparatus,
using the first sensor data to maintain an estimation of a state of the target in the outside scene until the host apparatus is reconnected with the head-mounted display.

* * * * *